(12) United States Patent
Liu et al.

(10) Patent No.: US 6,497,163 B2
(45) Date of Patent: Dec. 24, 2002

(54) DUAL DIAL RODS SPEED CHANGING CONTROLLER CAPABLE OF LINEAR DISPLACEMENT

(75) Inventors: Wen-Ching Liu, Taichung Hsien (TW); Yu-Chen Chen, Taichung Hsien (TW)

(73) Assignee: Falcon Industrial Co., Ltd., Taichung Hsien ( * ) Notice: Subject to any disclaimer, the term of this patent is extended or adjusted under 35 U.S.C. 154(b) by 0 days.

(21) Appl. No.: 09/824,634

(22) Filed: Apr. 4, 2001

(65) Prior Publication Data

US 2002/0144566 A1 Oct. 10, 2002

(51) Int. Cl.[7] .................................................. F16C 1/12
(52) U.S. Cl. ........................ 74/502.2; 74/527; 74/577 S
(58) Field of Search ........................... 74/502.2, 473.13, 74/473.14, 141.5, 473.05, 473.28, 489

(56) References Cited

U.S. PATENT DOCUMENTS

| 5,921,138 | A | * | 7/1999 | Kojima et al. |
| 6,095,309 | A | * | 8/2000 | Mione ......................... 192/217 |
| 6,199,446 | B1 | * | 3/2001 | Ose |
| 6,220,111 | B1 | * | 4/2001 | Chen ......................... 74/473.15 |

* cited by examiner

Primary Examiner—Charles A. Marmor
Assistant Examiner—Dennis Abdelnour
(74) Attorney, Agent, or Firm—Browdy and Neimark

(57) ABSTRACT

A linearly-displacing dual dial rods speed changing controller comprises a base, a wire hub seat, an advancing member, and a withdrawing member. The wire hub seat is fastened with a guide wire of a speed changer. The wire hub seat is controlled by dial rods of the advancing member and the withdrawing member to displace linearly in a reciprocating manner on the guide rail of the base, thereby actuating the guide wire to bring about a pulling action to attain the speed change.

8 Claims, 6 Drawing Sheets

DUAL DIAL RODS SPEED CHANGING CONTROLLER CAPABLE OF LINEAR DISPLACEMENT

FIELD OF THE INVENTION

The present invention relates generally to a bicycle, and more particularly to a dual dial rods speed changing controller of the bicycle, which is capable of linear displacement.

BACKGROUND OF THE INVENTION

As shown in FIG. 1, a prior art dual dial rods speed changing controller comprises a rotary wire hub seat 1 and a ratchet wheel 2, which are mounted coaxially on a pivot 4 of a base 3 and are fastened together. The wire hub seat 1 is of a round tray like construction and is fastened at one end with a guide wire 5 of the speed changing controller such that the center of the guide wire 5 and the axial center of the pivot 4 are separated by a constant distance r (rotational radius). The advancing dial rod 6 or the withdrawing dial rod 7 is dialed to control the gear change, the ratchet pawl 8 (or ratchet pawl 9) is engaged with a tooth of the ratchet 2, so as to actuate the ratchet 2 to turn. The ratchet 2 actuates the wire hub seat 1 to turn so as to cause the guide wire 5 to pull on the axial center of the pivot 4 serving as a center, thereby resulting in the control of speed change.

The prior art structure described has the following deficiencies.

The precision gear location of the prior art speed changing controller has to do with the magnitude of an interval between the adjoining ratchet teeth and the distance r between the center of the guide wire and the axial center of the pivot 4. The magnitude of the interval of the adjoining ratchet teeth determines the revolving angle of the ratchet 2. Generally speaking, the tooth distance of the ratchet of the same controller and the magnitude of the guide wire diameter are attained by calculation. Their relationship is fixed. The guide wire 5 is vulnerable to detachment from the wire hub seat 1 due to the constant drag. As a result, the guide wire must be replaced with a new one which must be equal in diameter to the old one. If the new guide wire is greater or smaller in diameter than the old guide wire which is replaced, there will be a change in the distance between the center of the guide wire and the axial center of the pivot. As a result, the specified tensile of the guide wire may turn out to be excessive or inadequate, thereby undermining the efficiency of speed change control.

The guide wire is made of a steel filament having a specified rigidity. As the guide wire is wound on the wire hub seat, the guide wire is not in an intimate contact with the rotary wall surface of the wire hub seat due to the insufficient pull force. As a result, there will be a change in the distance between the center of the guide wire and the axial center of the pivot.

SUMMARY OF THE INVENTION

The primary objective of the present invention is to provide a dual dial rods speed changing controller capable of linear displacement and suitable for use in conjunction with guide wires of various diameters.

The primary objective of the present invention is to provide a dual dial rods speed changing controller capable of linear displacement and suitable for use in conjunction with the guide wires of various diameters.

The controller of the present invention is intended to bring about the action of dragging the guide wire of a speed changer. The controller comprises a base; a wire hub seat mounted on the base such that the wire hub seat moves linearly in a reciprocating manner and that the wire hub seat is fastened at one end with the guide wire; an advancing member mounted on the base and provided with an advancing dial rod capable of swiveling between a first position and a second position so as to actuate the wire hub seat to advance at the time when the advancing dial rod is acted on by an external force. When the advancing dial rod is relieved of the external force, the advancing dial rod swivels back to the first position; a withdrawing member mounted on the base and provided with a withdrawing dial rod capable of swiveling between a third position and a fourth position at the time when the withdrawing dial rod is exerted on by another external force, thereby linking the wire hub seat to displace in reverse. As the withdrawing dial rod is relieved of the external force, the withdrawing dial rod swivels back to the third position.

DETAILED DESCRIPTION OF THE INVENTION

Figure 1:
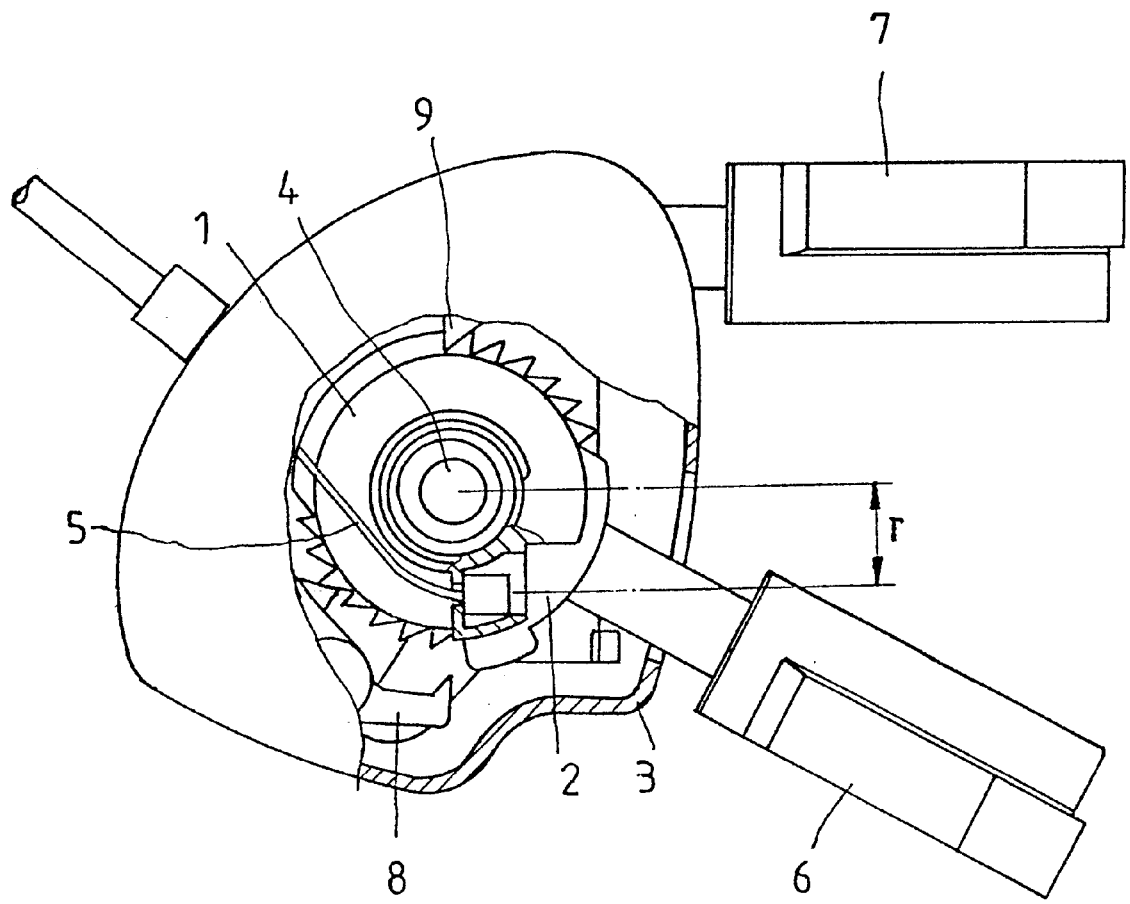
FIG. 1 shows a partial schematic view of a dual dial rods speed changing controller of the prior art.
Figure 2:
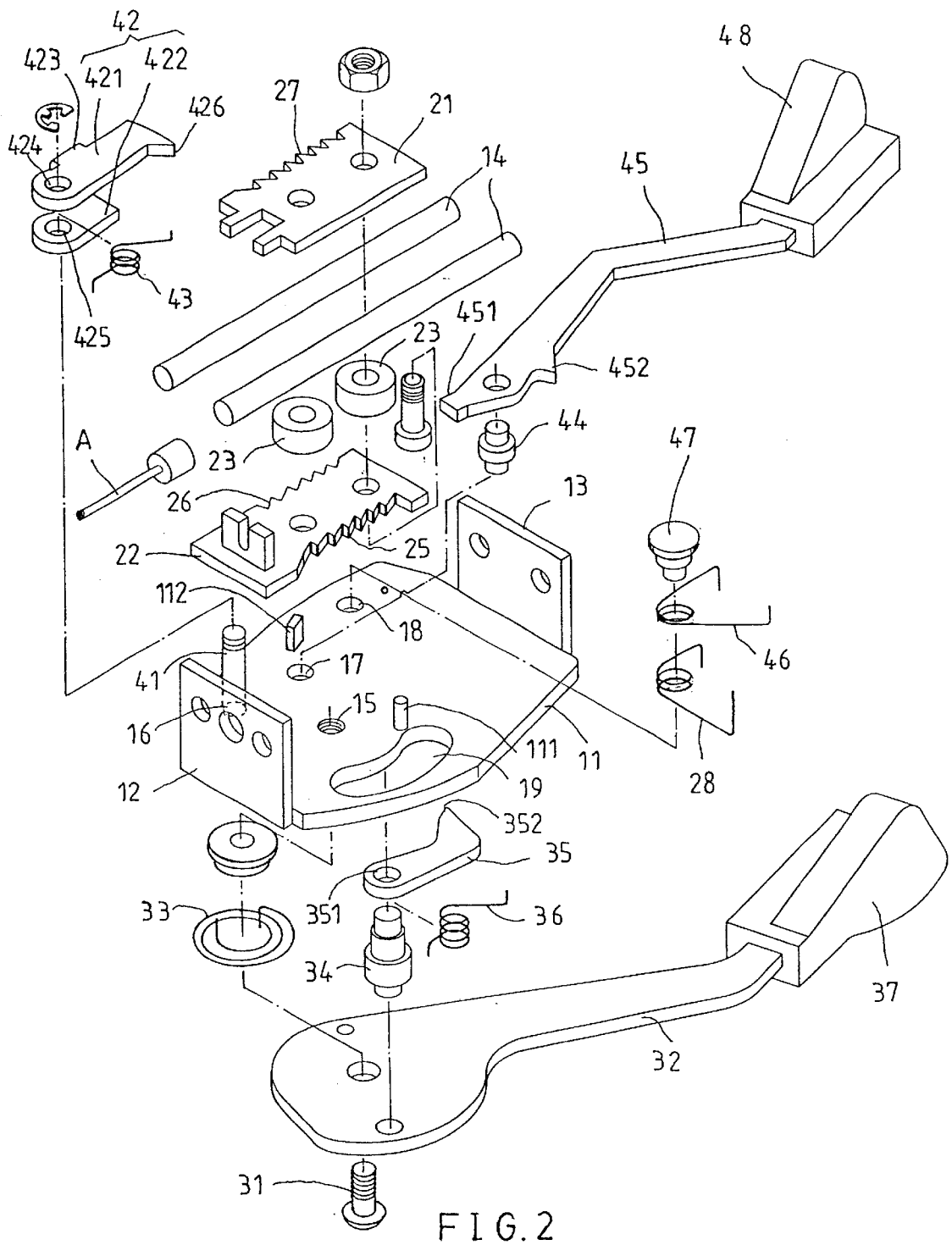
FIG. 2 shows an exploded view of a preferred embodiment of the present invention.
Figure 3:
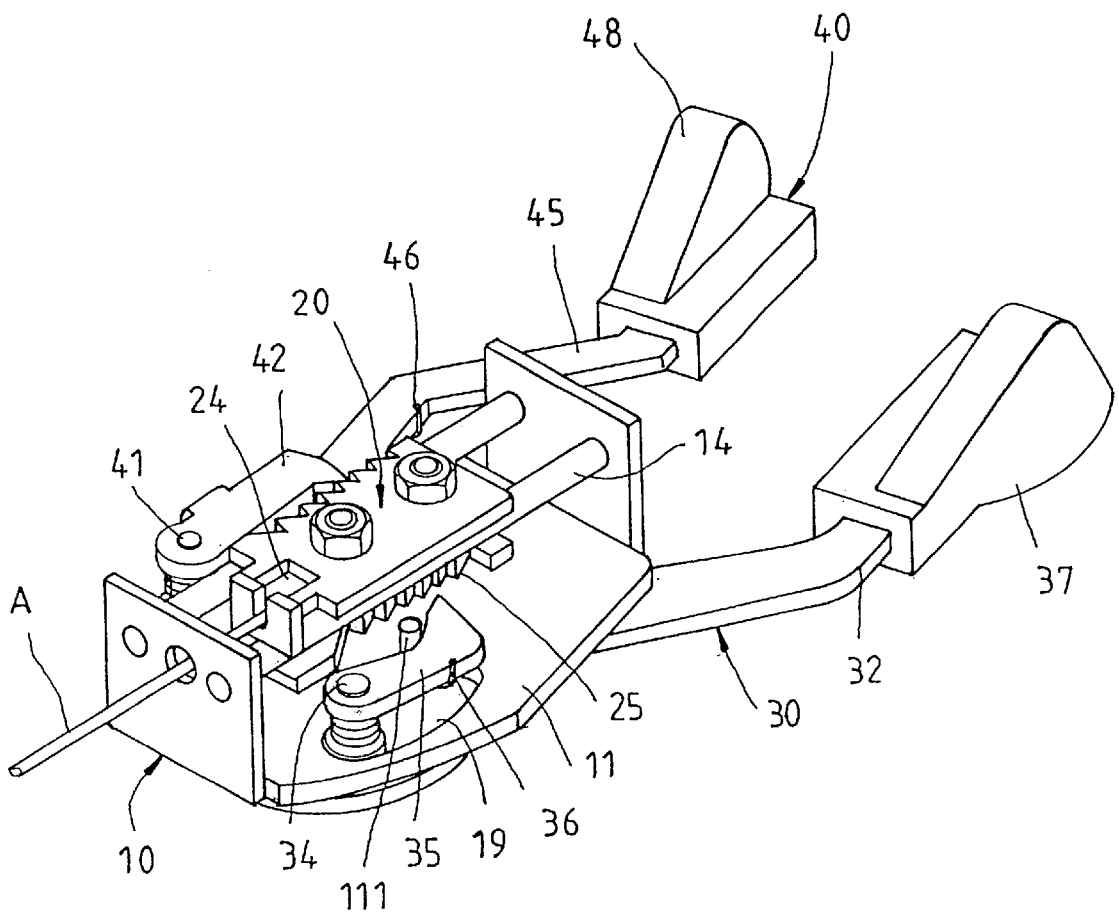
FIG. 3 shows a perspective view of the preferred embodiment of the present invention as shown in FIG. 2 as assembled.
Figure 4:
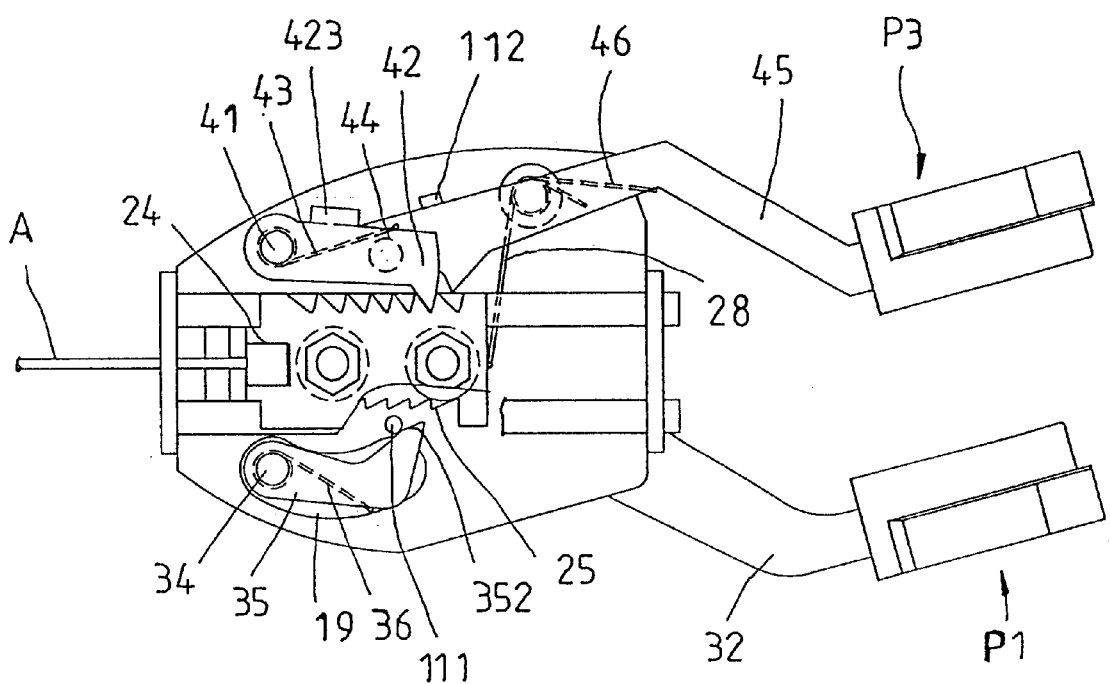
FIG. 4 is a top view and a partial sectional view of the preferred embodiment of the present invention to illustrate the positions of the advancing and the withdrawing dial rods in normal state.

As shown in FIGS. 2, 3 and 4, a linearly displacing dual dial rods speed changing controller of the present invention is mounted on a bicycle handlebar (not shown in the drawings). The controller has a housing (not shown in the drawings) for housing a base 10, a wire hub seat 20, an advancing member 30, and a withdrawing member 40.

The base 10 has a base plate 11, a front plate 12 mounted uprightly on the base plate 11, and a rear plate 13 mounted uprightly on the base plate 11. Located between the front plate 12 and the rear plate 13 are two parallel guide rails 14. The base plate 11 has a first through hole 15, a second through hole 16, a third through hole 17, a fourth through hole 18, and an arcuate slot 19. The arcuate slot 19 is provided in the peripheral edge with a protruded pin 111 and a stop member 112.

The wire hub seat 20 is of a rectangular shape and is formed of an upper flat plate 21 and a lower flat plate 22 for fastening two pad blocks 23, so as to form a slide block body having in two sides thereof a guide slot. The wire hub seat 20 makes use of the guide slots to insert the guide rail 14. The wire hub seat 20 is provided at the front end with a receiving slot 24 for fixing the connector of a guide wire A of the speed changer. The lower flat plate 22 is provided in one long side thereof with a first ratchet tooth portion 25, and in the other long side thereof with a third ratchet tooth portion 26. The upper flat plate 21 is provided with a second ratchet tooth portion 27 opposite to the third ratchet tooth portion 26 of the lower flat plate 22. Each ratchet tooth portion has a plurality of tooth positions. A first torsion spring 28 is disposed on the base 10 such that one end of the first torsion spring 28 urges the rear end of the wire hub seat 20 for providing a first bias force to cause the wire hub seat 20 to displace linearly along each guide rail 14.

The advancing member 30 comprises a first pivot 31, an advancing dial rod 32, a second torsion spring 33, a second pivot 34, an advancing ratchet pawl 35, and a third torsion spring 36. The first pivot 31 is fixed in the first through hole 15 and is located in the underside of the base plate 11 for disposing the second torsion spring 33 and one end of the advancing dial rod 32. The other end of the advancing dial rod 32 is disposed with a contact member 37. Two ends of the second torsion spring 33 are connected with the base plate 11 and the advancing dial rod 32 for providing the advancing dial rod 32 with a clockwise second bias force.

The second pivot 34 is fastened with the advancing dial rod 32 and is put through the arcuate slot 19 for disposing the third torsion spring 36 and one pivoting hole 351 of the advancing ratchet pawl 35. The advancing ratchet pawl 35 is provided at one end with a pawl portion 352 corresponding in location to the first ratchet tooth portion 25. One end of the torsion spring 36 is rested against the advancing ratchet pawl 35 for providing the advancing ratchet pawl 35 with a counterclockwise third bias force.

The withdrawing member 40 comprises a third pivot 41, a locating ratchet pawl 42, a fourth torsion spring 43, a fourth pivot 44, a withdrawing dial rod 45, a fifth torsion spring 46, and a fifth pivot 47. The third pivot 41 is fixed with the second through hole 16 and is located in the top of the base plate 11. The locating ratchet pawl 42 has a first lug 421, a second lug 422, which are connected by a side plate 423 and are coaxially provided with a pivoting hole 424, 425. The locating ratchet pawl 42 is provided with the fourth torsion spring 43 disposed between the lugs and fitted over the third pivot 41. One end of the fourth torsion spring 43 is rested against the locating ratchet pawl 42 for providing the locating ratchet pawl 42 with a clockwise fourth bias force. The locating ratchet pawl 42 is provided at one end with a pawl portion 426 which is corresponding in location to the second ratchet tooth portion 27.

The fourth pivot 44 and the fifth pivot 47 are respectively fastened with the third through hole 17, and the fourth through hole 18 such that they are located on the top of the base plate 11. The withdrawing dial rod 45 is pivoted with the fourth pivot 44 and is provided at one end with a push portion 451 and a retaining portion 452 corresponding in location to the third ratchet tooth portion 26. The withdrawing dial rod 45 is provided at other end with a contact member 48. The fifth torsion spring 46 is fitted over the fifth pivot 47 and is connected at both ends with the base plate 11 and the withdrawing dial rod 45 for providing the withdrawing dial rod 45 with a counterclockwise fifth bias force. The fifth pivot 47 is provided with the first torsion spring 28 fitted thereover.

As shown in FIG. 4, under the normal circumstance, the advancing dial rod 32 is acted on by the second bias force such that the second pivot 34 is rested against the arcuate slot 19 and is located at a first position P1. The advancing ratchet pawl 35 is acted on by the third bias force such that one side of the advancing ratchet pawl 35 comes in contact with the protruded pin 111, and that the pawl portion 352 is not engaged with the first ratchet tooth portion 25. In the meantime, the locating ratchet pawl 42 is engaged with the second ratchet tooth portion 27 for fixing the position of the wire hub seat 20. The withdrawing dial rod 45 is acted on by the fifth bias force such that the rod body of the withdrawing dial rod 45 is rested against the stop member 112, so as to locate at a third position P3. The retaining portion 452 is not engaged with the third ratchet tooth portion 26.

Figure 5:
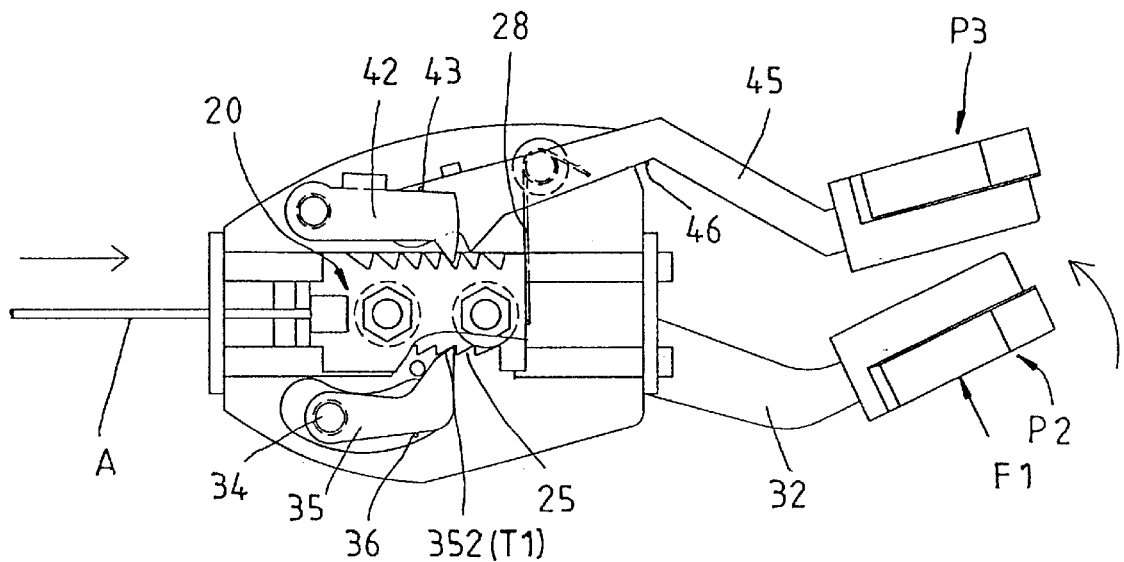
FIG. 5 is similar to FIG. 4 to illustrate the course of the displacement of the advancing dial rod from the first position to the second position at the time when the advancing dial rod is exerted on by the external force.

As shown in FIG. 5, when the advancing dial rod 32 is acted on by a counterclockwise external force F1 to swivel from the first position P1 to the second position P2, the advancing ratchet pawl 35 displaces such that it is exerted on by the third bias force to cause the pawl portion 352 to engage a tooth position T1 of the first ratchet tooth portion 25, thereby pushing the wire hub seat 20 to overcome the first bias force to advance forward.

Figure 6:
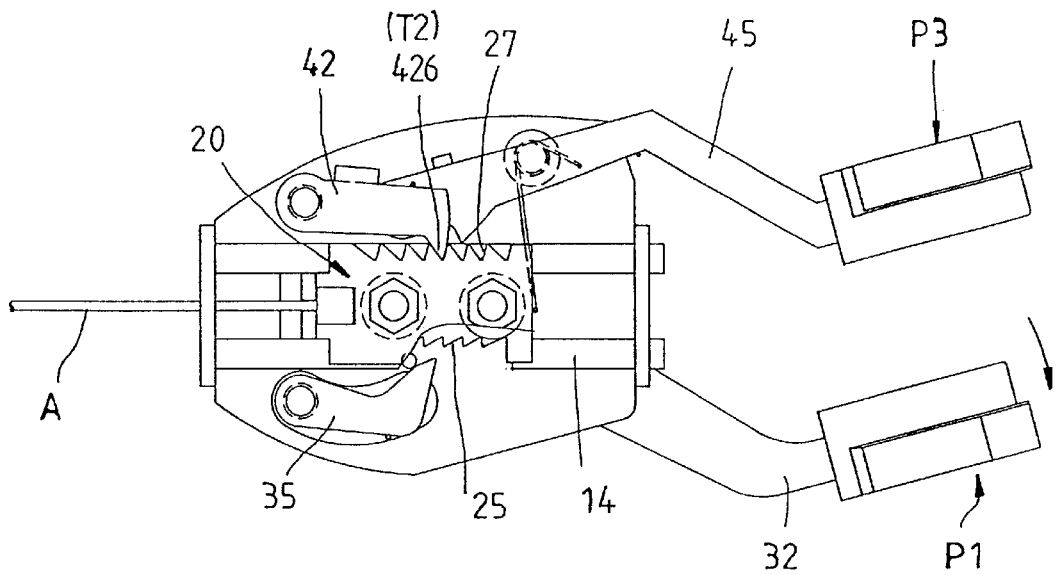
FIG. 6 is similar to FIG. 5 to illustrate the return of the advancing dial rod to the first position.

As shown in FIG. 6, as the external force F1 is removed, the advancing dial rod 32 is acted on by the second bias force to swivel from the second position P2 to the first position P1. In the meantime, the locating ratchet pawl 42 is meshed with a tooth position T2 of the second ratchet tooth portion 27. The wire hub seat 20 is once again fixed, so as to attain the advancement of gear.

Figure 7:
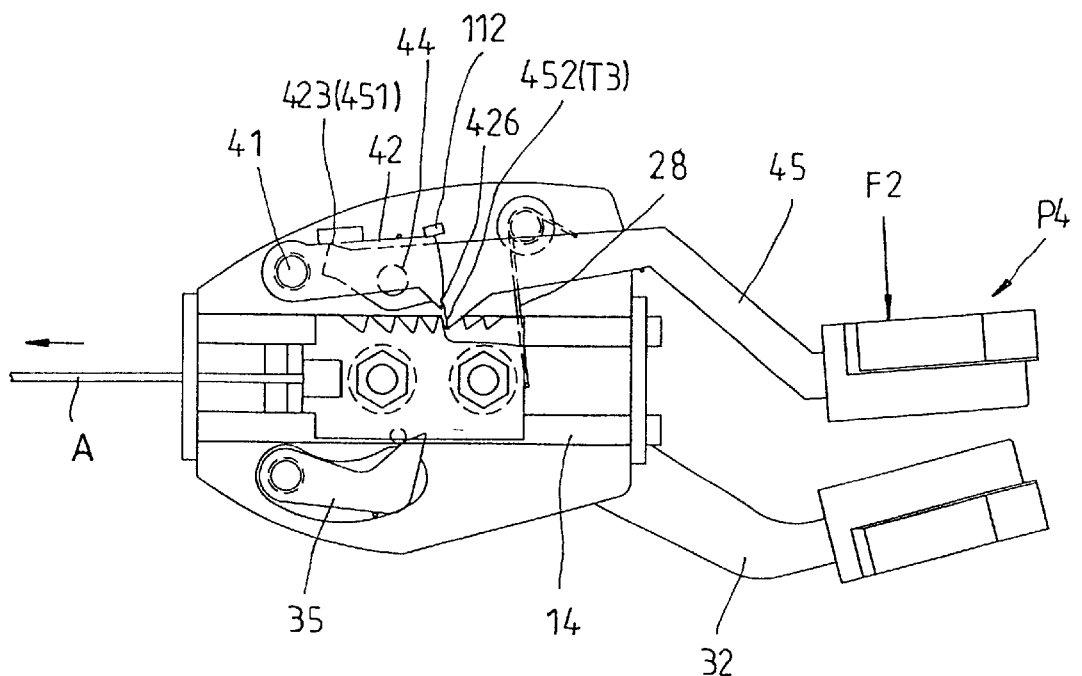
FIG. 7 is similar to FIG. 4 to illustrate the course of the displacement of the withdrawing dial rod from the third position to the fourth position at the time when the withdrawing dial rod is exerted on by the external force.
Figure 8:
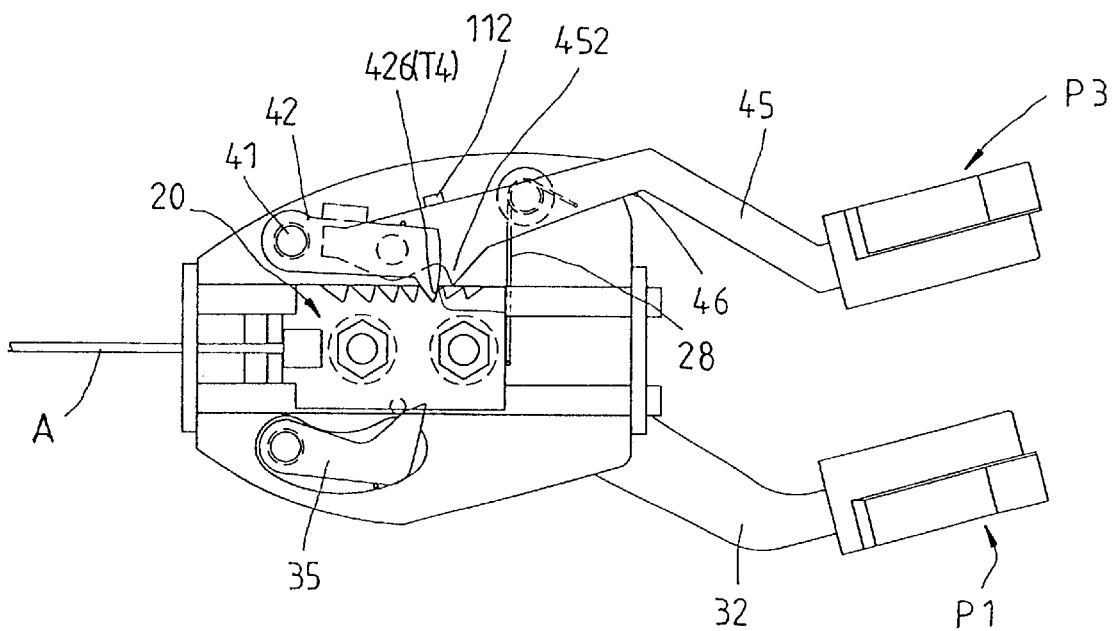
FIG. 8 is similar to FIG. 7 to illustrate the return of the withdrawing dial rod to the third position.

As shown in FIG. 7, when the withdrawing dial rod 45 is exerted on by a clockwise external force F2 to swivel from the third position P3 to a fourth position P4, the push portion 451 pushes the side plate 423 of the locating ratchet pawl 42 to overcome the fourth bias force so as to force the pawl portion 426 to move away from the tooth position T2. In the meantime, the wire hub seat 20 is exerted on by the first bias force which is provided by the first torsion spring 28, as well as the pull force of the guide wire A, thereby resulting in the reverse displacement of the wire hub seat 20. One side edge of the retaining portion 452 is rested against a tooth position T3 of the third ratchet tooth portion 26, so as to make sure that the wire hub seat 20 is withdrawn. Now referring to FIG. 8, the external force F2 is removed, the withdrawing dial rod 45 is exerted on by the fifth bias force to swivel from the fourth position P4 back to the third position P3. In the meantime, the locating ratchet pawl 42 is acted on by the fourth bias force to engage a tooth position T4 of the second ratchet tooth portion, so as to fix the position of the wire hub seat 20. The withdrawal of gear is thus attained.

When the gear-shifting process is under way, the wire hub seat 20 displaces linearly in a reciprocating manner. The pulling action of the guide wire A is brought about by the advancement and the withdrawal of the wire hub seat 20, in contrast with the prior art rotary wire hub seat which pulls the guide wire. The efficiency of the rotary wire hub seat is dependent on the rotational radius. The magnitude of the rotational radius depends on the size of the diameter of the guide wire. As a result, the guide wire of the prior art speed changer has the problem of compatibility. According to the present invention, the way that the guide wire is pulled is not affected by the size of the diameter of the guide wire. In addition, the guide wire of the present invention is fully compatible in terms of replacement.

What is claimed is:

1. A linearly-displacing dual dial rods speed changing controller for dragging a guide wire of a speed changer, said controller comprising:

a base;

a wire hub seat mounted on said base such that said wire hub seat displaces linearly in a reciprocating manner, said wire hub seat being fastened at one end with the guide wire;

an advancing member mounted on said base and formed of an advancing dial rod capable of swiveling between a first position and a second position at the time when said advancing dial rod is exerted on by an external force, thereby actuating said wire hub seat to advance, said advancing dial rod swiveling back to said first position at such time when said advancing dial rod is relieved of the external force exerting thereon;

a withdrawing member disposed on said base and formed of a withdrawing dial rod capable of swiveling between a third position and a fourth position at the time when said withdrawing dial rod is exerted on by another external force, thereby linking said wire hub seat to displace in reverse to locate, said withdrawing dial rod capable of swiveling back to said third position at such time when said withdrawing dial rod is relieved of the external force exerting thereon;

wherein said base has two parallel guide rails; wherein said wire hub seat is acted on by a first bias force to displace along said two parallel guide rails, said wire hub seat having a first ratchet tooth portion, a second ratchet tooth portion, and a third ratchet tooth portion, with each having a plurality of tooth positions; wherein said advancing member is further formed of an advancing ratchet pawl; wherein said advancing dial rod is pivoted to said base and is acted on by a second bias force, said advancing ratchet pawl being pivoted to said advancing dial rod and being acted on by a third bias force, said advancing ratchet pawl being acted on by said third bias force to engage a tooth position of said first ratchet tooth portion at such time when said advancing dial rod swivels from said first position to said second position, thereby actuating said wire hub seat to overcome said first bias force to advance, said advancing dial rod being caused by said second bias force to swivel back to said first position; wherein said withdrawing member is further formed of a locating ratchet pawl which is pivoted to said base and is acted on by a fourth bias force, said locating ratchet pawl being engaged with a tooth position of said second ratchet tooth portion so as to fix said wire hub seat; wherein said withdrawing dial rod is pivoted to said base and is acted on by a fifth bias force, said withdrawing dial rod forcing said locating ratchet pawl to move away from said tooth position of said second ratchet tooth portion at such time when said withdrawing dial rod swivels from said third position to said fourth position, said withdrawing dial rod having a retaining portion which retains a tooth position of said third ratchet tooth portion, said withdrawing dial rod being acted on by said fifth bias force to swivel back to said third position, said wire hub seat being acted on said first bias force to withdraw in reverse, said locating ratchet pawl being acted on by said fourth bias force to engage once again a next tooth position of said second ratchet tooth portion, so as to fix said wire hub seat; and wherein said base has a front plate, a rear plate, and two parallel guide rails located between said front plate and said rear plate; wherein said wire hub seat is rectangular and is formed of an upper flat plate and a lower flat plate, which hold said two guide rails; wherein said base is provided with a first torsion spring to provide said first bias force.

2. The controller as defined in claim 1, wherein said lower flat plate is provided in one longitudinal side with said first ratchet tooth portion, and in other longitudinal side with said third ratchet tooth portion, said upper flat plate and said third ratchet tooth portion of said lower flat plate provided in the same longitudinal side with said second ratchet tooth portion.

3. The controller as defined in claim 1, wherein said base is provided in an underside with a first pivot; wherein said advancing dial rod is pivoted to said first pivot, said base and said advancing dial rod being connected therebetween by a second torsion spring for providing said second bias force.

4. The controller as defined in claim 3, wherein said base has an arcuate slot which is provided in a peripheral edge with a protruded pin and a second pivot fastened with said advancing dial rod and put through said arcuate slot, said advancing ratchet pawl being pivoted to said second pivot, said second pivot and said advancing ratchet pawl being connected by a third torsion spring for providing said third bias force; wherein said advancing dial rod is located at said first position such that said advancing ratchet pawl comes in contact with said protruded pin.

5. The controller as defined in claim 4, wherein said base is provided with a third pivot for pivoting said locating ratchet pawl, said base and said locating ratchet pawl being connected therebetween by a fourth torsion spring for providing said fourth bias force.

6. The controller as defined in claim 5, wherein said base is provided with a fourth pivot for pivoting said withdrawing dial rod, said base and said withdrawing dial rod being provided therebetween with a fifth torsion spring for providing said fifth bias force.

7. The controller as defined in claim 1, wherein said locating ratchet pawl has a side plate; wherein said withdrawing dial rod has a push portion, which is rested against said side plate to overcome said fourth bias force at the time when said withdrawing dial rod swivels from said third position to said fourth position.

8. The controller as defined in claim 1, wherein said base has a stop member; wherein said withdrawing dial rod is rested against said stop member so as to fix said withdrawing dial rod at said third position.

* * * * *